United States Patent
Wu et al.

(10) Patent No.: US 8,941,328 B2
(45) Date of Patent: Jan. 27, 2015

(54) VARIABLE POWER DIMMING CONTROL CIRCUIT

(71) Applicant: Unity Opto Technology Co., Ltd., New Taipei (TW)

(72) Inventors: Chih-Hsien Wu, New Taipei (TW); Wei Chang, New Taipei (TW); Huan-Ying Lu, New Taipei (TW); Kai-Cheng Chuang, New Taipei (TW); Shao-Wei Chiu, New Taipei (TW)

(73) Assignee: Unity Opto Technology Co., Ltd., New Taipei (TW)

( * ) Notice: Subject to any disclaimer, the term of this patent is extended or adjusted under 35 U.S.C. 154(b) by 0 days.

(21) Appl. No.: 13/927,323

(22) Filed: Jun. 26, 2013

(65) Prior Publication Data

US 2014/0320031 A1 Oct. 30, 2014

(30) Foreign Application Priority Data

Apr. 26, 2013 (TW) .............................. 102115052 A

(51) Int. Cl.
*H05B 37/02* (2006.01)
*H05B 33/08* (2006.01)

(52) U.S. Cl.
CPC .................................. *H05B 33/0845* (2013.01)
USPC .......................................... 315/307; 315/297

(58) Field of Classification Search
USPC .................. 315/291, 294, 297, 307, 308, 312
See application file for complete search history.

(56) References Cited

U.S. PATENT DOCUMENTS

| | | | |
|---|---|---|---|
| 8,232,736 B2 * | 7/2012 | Melanson | 315/247 |
| 8,278,832 B2 * | 10/2012 | Hung et al. | 315/219 |
| 8,456,108 B2 * | 6/2013 | Kimura et al. | 315/307 |
| 8,669,715 B2 * | 3/2014 | Riesebosch | 315/276 |
| 8,742,674 B2 * | 6/2014 | Shteynberg et al. | 315/201 |
| 2007/0182347 A1 * | 8/2007 | Shteynberg et al. | 315/312 |
| 2008/0224636 A1 * | 9/2008 | Melanson | 315/307 |
| 2011/0285301 A1 * | 11/2011 | Kuang et al. | 315/200 R |
| 2012/0146531 A1 * | 6/2012 | Uchimoto et al. | 315/224 |

* cited by examiner

*Primary Examiner* — Tung X Le
(74) *Attorney, Agent, or Firm* — Rosenberg, Klein & Lee

(57) ABSTRACT

Disclosed is a variable power dimming control circuit for driving and linearly adjusting the illumination brightness of a plurality of light emitting diodes (LEDs), and the circuit includes a dimming stabilization unit and a control unit. The control unit is provided for detecting an input current of a circuit, and the dimming stabilization unit is driven for outputting a holding current when the input power is smaller than a standard, and stopping the output the holding current when the input power is greater than the standard. When the LEDs are dimmed to low luminance, a chip controls the operation of the dimming stabilization unit to assure the stability of the dimming operation of a TRIAC. When the LEDs are adjusted to high or full brightness, the chip stops the output of the holding current to reduce unnecessary power consumption and enhance the overall circuit performance effectively.

9 Claims, 8 Drawing Sheets

VARIABLE POWER DIMMING CONTROL CIRCUIT

CROSS-REFERENCE TO RELATED APPLICATIONS

This non-provisional application claims priority under 35 U.S.C. §119(a) on Patent Application No(s). 102115052 filed in Taiwan, R.O.C. on Apr. 26, 2013, the entire contents of which are hereby incorporated by reference.

BACKGROUND OF THE INVENTION

1. Field of the Invention

The present invention relates to the field of light emitting diode (LED) power devices, and more particularly to a variable power dimming control circuit that supports the linear light dimming of a bi-directional TRI-electrode AC (TRIAC) switch and provides a holding current to stabilize the operating quality of the TRIAC switch when the LED is dimmed to a low brightness, and stops supplying the output of the holding current when the brightness of the LED is increased, so as to achieve the effects of reducing unnecessary power consumption of the circuit and minimizing the heat produced during the operation of the LED.

2. Description of the Related Art

At present, most driver circuits of an LED lamp adopt a conduction angle for inputting electric power by a TRIAC control to achieve the effect of adjusting the brightness of the LED and a current design of connecting the LED with a transistor and a sense resistor in series in order to stabilize the power and improve the quality of illumination. The sense resistor is provided for sensing a driving current passing through the LED and producing a voltage drop at both ends of the LED, and then a comparator is provided for electrically connecting or disconnecting the transistor to timely adjust the duty ratio of a pulse width modulation (PWM) signal when a high-level or a low-level switch signal is outputted to the transistor after the voltage drop is compared. Therefore, the conduction cycle of the PWM signal can be used for controlling the output of electric power that affects the magnitude of the driving current and the brightness of the LED. However, the TRIAC is a component that requires a standard operating voltage, so that if the conduction angle of the input power is too small and the overall operating voltage of the circuit has a voltage power smaller than a standard operating voltage required by the TRIAC, the TRIAC will be unable to operate normally, and the operating quality of the driver circuit will be affected adversely. To overcome these problems, the driver circuit installs an additional bleeding circuit for supplying a holding current to stabilize the TRIAC and maintaining a stable operating quality, while solving the blinking problem and expanding the dimming range.

With reference to FIGS. 1 and 2 for a circuit diagram and a waveform diagram of a conventional LED driver circuit with a holding current respectively, the driver circuit 1 comprises a dimmer 10, a bridge rectifier 11, a holding switch 12, a current resistor ($R_H$) 13 and a filter capacitor 14. The bridge rectifier 11 receives an external power supply through the dimmer 10 and rectifies the power to produce an input voltage ($V_{in}$) and an input current ($I_{in}$). The filter capacitor 14 receives and converts the input current to produce and supply a driving current ($I_L$) to the LED. The holding switch 10 is an N-type metal oxide semiconductor field effect transistor (N-MOSFET) having a drain coupled to the bridge rectifier 11 for receiving an input current, a source coupled to the current resistor 13, and a gate for receiving a holding voltage ($V_H$), so that the current resistor 13 can receive the holding voltage through the holding switch 12 and output a holding current ($I_{hold}$), wherein $I_{hold}=(V_H-V_{GS\_N-MOSFET})/R_H$. Therefore, the input current as shown in FIG. 2 has a constant current value $I_{hold}$ in Cycle $T_1$ (when the LED has a lower brightness or the LED is turned off) and the input current has a current value of $I_L+I_{hold}$ in Cycle $T_2$ (when the LED has a higher or full brightness). In other words, regardless of the magnitude of the input power of the circuit, the holding current keeps operating, and thus causing the problems of consuming unnecessary power and lowering the power conversion efficiency of the whole circuit.

In view of the aforementioned problems, the present invention intends to improve the circuit architecture of the conventional driver circuit by using a simple detection circuit to timely adjust the holding current of the TRIAC to maintain a constant driving current value while reducing unnecessary power consumption effectively. To cope with the physical properties of the LED, the simple circuit architecture is used to provide a high voltage compensation for the input voltage, so as to achieve the effects of improving the operating quality of the whole circuit and the light emitting power of the operating quality effectively.

SUMMARY OF THE INVENTION

Therefore, it is a primary objective of the present invention to provide a variable power dimming control circuit that detects the magnitude of an input voltage power to timely output or stop outputting a basic voltage power for the normal operation of the holding TRIAC, so as to achieve the effects of improving the dimming stability of the whole circuit and reducing the unnecessary power consumption of the whole circuit.

To achieve the aforementioned objectives, the present invention provides a variable power dimming control circuit for driving and linearly adjusting the illumination brightness of a plurality of light emitting diodes (LEDs) which are electrically connected in series with each other or installed on a light board module, comprising: a dimming unit, a rectification unit, a dimming stabilization unit, a driving unit and a control unit. The rectification unit is electrically coupled to an external power supply through the dimming unit for receiving and rectifying an alternate current (AC) voltage of the external power supply and then outputting an input current. The dimming stabilization unit comprises a constant current device and a switch, and the constant current device is electrically coupled to the rectification unit and the switch for receiving the input current to generate a holding current. The driving unit is electrically coupled to the rectification unit, the constant current device and the light board module for receiving the input current and then supplying a driving current to the LEDs. The control unit comprises a detector, a controller, a current limiter and a feedback device, wherein the detector is electrically coupled to the rectification unit, the driving unit and the controller, and the controller is electrically coupled to the switch, the current limiter and the feedback device, and the current limiter is electrically coupled to the light board module and the feedback device. The detector is provided for receiving and detecting the input current to produce a detection value, and the feedback device is provided for receiving and sensing the driving current to produce a feedback value, and the controller is provided for comparing the detection value with the feedback value and then outputting a driving signal to drive the current limiter to adjust the current magnitude of the driving current, such that the input current $I_{in}$ and the driving current $I_L$ satisfy the relation of $I_{in}=I_L$, while the controller compares the feedback value with a reference value. If the feedback value is smaller than the reference value, a stable signal will be outputted to conduct the switch to allow the dimming stabilization unit to output the holding current, so that when the LEDs are dimmed to a minimum brightness or turned off, the input current $I_{in}$ and the holding current $I_{hold}$ satisfy the relation of $I_{in}=I_{hold}$ for stabilizing the operating quality of the dimming unit and reducing unnecessary power consumption.

Wherein, the rectification unit is a full-wave bridge rectifier, and the dimming unit is a bidirectional TRIAC for receiving and adjusting an input phase conduction angle of the external power supply to change the input power and adjust the brightness of light emitted from the LEDs. The driving unit includes an isolator and a wave filter, and both ends of the isolator are coupled to the full-wave bridge rectifier and the wave filter respectively to obstruct the wave filter and the light board module to have a voltage change produced by a load change that affects the operating stability of the bidirectional TRIAC, and the wave filter is coupled to the LEDs for converting an input current transmitted from the isolator into the driving current and then transmitting the driving current to the LEDs to enhance the noise resistance of the circuit. The current limiter is an N-MOSFET, and the feedback device is a resistor component, and the current limiter has a drain coupled to the wave filter and the LEDs, a gate coupled to an output terminal of the controller, and a source coupled to the feedback device to constitute a negative feedback circuit architecture to provide a stable current control effect, and the current limiter is installed on a surface of the light board module to enhance the heat dissipation efficiency.

In this preferred embodiment, the constant current device is a current mirror component, and the switch is an N-MOSFET, and the controller is comprised of an operational amplifier and a comparator; and the operational amplifier has an output terminal coupled to a gate of the current limiter, a positive input terminal coupled to the detector for receiving the detection value, and a negative input terminal coupled to a negative input terminal of the comparator and the feedback device for receiving the feedback value; and the comparator has a positive input terminal for receiving the reference value and an output terminal coupled to a gate of the switch, and a drain of the switch is coupled to an output terminal of the current mirror component. The control unit further includes a compensator, and the compensator is comprised of a first resistor $R_1$ and a second resistor $R_2$, and a terminal of the first resistor is coupled to a drain of the current limiter and has a voltage value $V_D$, and the other terminal of the first resistor is coupled to a terminal of the second resistor, a negative input terminal of the operational amplifier and a negative input terminal of the comparator, and the other terminal of the second resistor is coupled to the feedback device $R_S$, so that when the positive input terminal of the operational amplifier receives the detection value $V_A$, the driving current $I_L$ satisfies the relation of $I_L=[V_A-V_D(R_2/R_1+R_2)]/R_S$. The constant current device the constant current device is a power transfer component, and the switch is an N-MOSFET, and the controller is comprised of an operational amplifier, a comparator and an AND gate, and the operational amplifier has an output terminal coupled to a gate of the current limiter, a positive input terminal coupled to the detector for receiving the detection value, and a negative input terminal coupled to a negative input terminal of the comparator and the feedback device for receiving the feedback value, and a positive input terminal of the comparator is provided for receiving the reference value, and an output terminal is coupled to an input terminal of the AND gate, and the other input terminal of the AND gate is provided for receiving a reference wave, and an output terminal is coupled to a gate of the switch, and a drain of the switch is coupled to an output terminal of the power transfer component. The power transfer component is an inductor, and the dimming stabilization unit further includes a transfer diode having an input terminal coupled to the inductor and an output terminal coupled to the isolator and the wave filter, so that the input current is transferred by the inductor and passed through the transfer diode to produce a secondary holding current $I_{hold}'$. The control unit further includes a compensator comprised of a first resistor $R_1$ and a second resistor $R_2$, and a terminal of the first resistor is coupled to the current limiter and has a voltage value $V_D$, and the other terminal of the first resistor is coupled to a terminal of the second resistor, a negative input terminal of the operational amplifier and a negative input terminal of the comparator, and the other terminal of the second resistor is coupled to the feedback device $R_S$, so that when the positive input terminal of the operational amplifier receives the detection value $V_A$, the driving current $I_L$ satisfies the relation of $I_L=[V_A-V_D(R_2/R_1+R_2)]/R_S+I_{hold}'$.

In summation of the description above, the present invention controls the output of the holding current by a simple switch component to avoid unnecessary power consumption caused by outputting the holding current continuously when the LEDs are adjusted to the maximum brightness, and further stops outputting the holding current to reduce the total heat energy produced by the operation of the circuit when the power consumption of the circuit is decreased, so as to facilitate the heat dissipation effect, assure the normal operation of electronic components and extend the service life. Even more, the dimming stabilization unit can transfer the input voltage power to the light board module through the power transfer component and the diode to facilitate converting the voltage power through the power transfer component when the switch is turned off and enhance the overall operating efficiency of the circuit.

DETAILED DESCRIPTION OF THE PREFERRED EMBODIMENTS

The technical content of the present invention will become apparent with the detailed description of preferred embodiments and the illustration of related drawings as follows.

Figure 1:
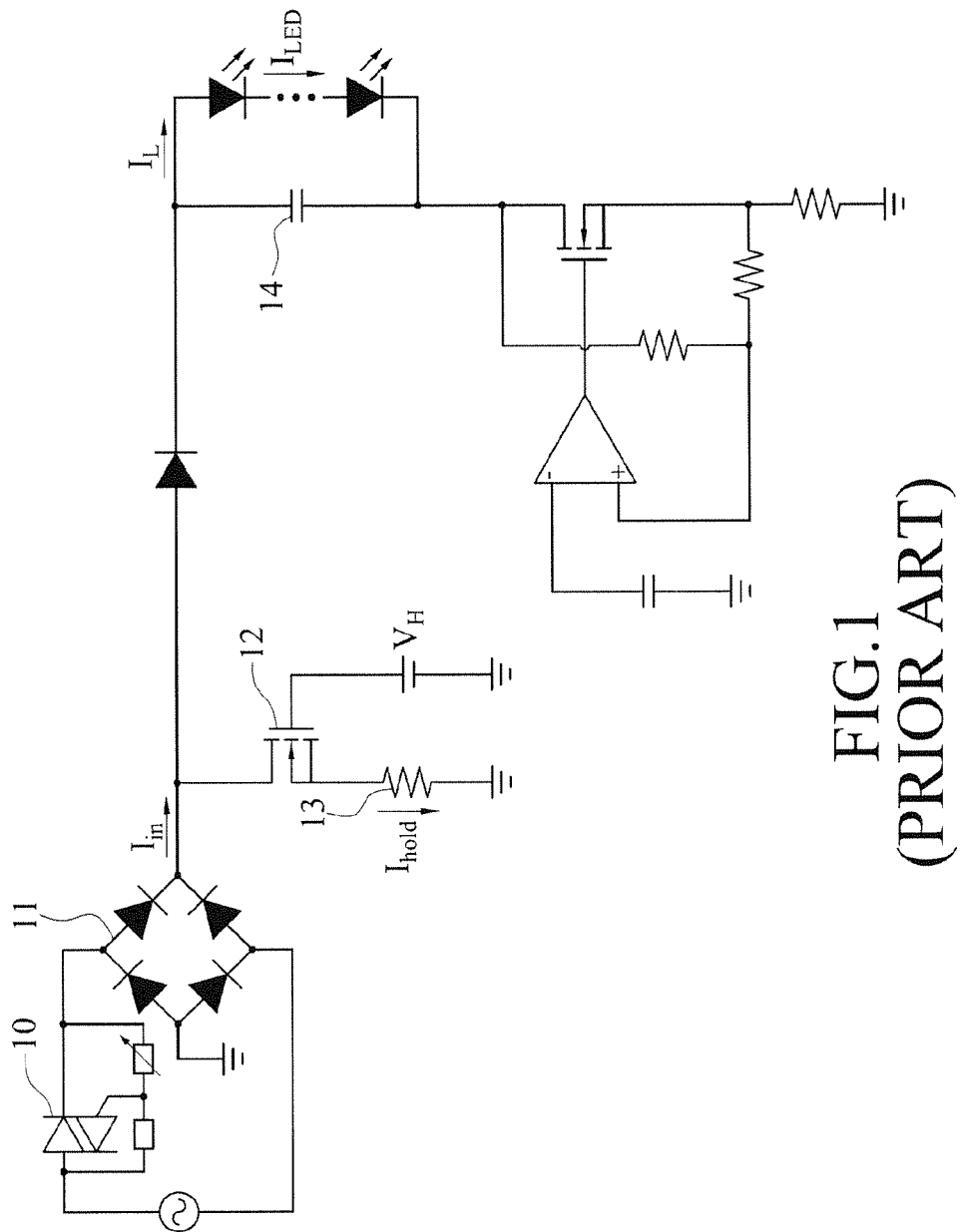
FIG. 1 is a circuit diagram of a conventional LED driver circuit with a holding current.
Figure 2:
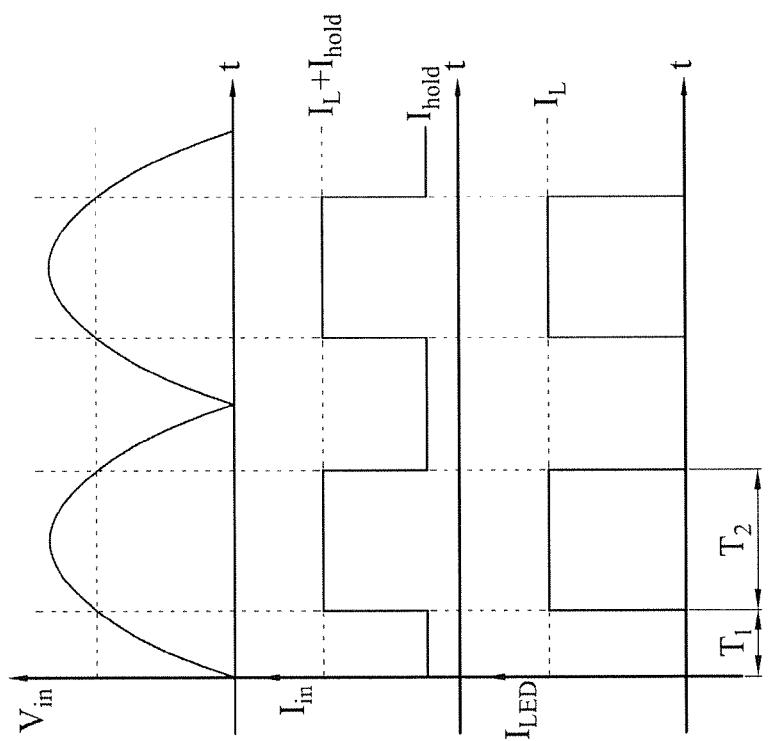
FIG. 2 is a waveform diagram of a conventional LED driver circuit with a holding current.
Figure 3:
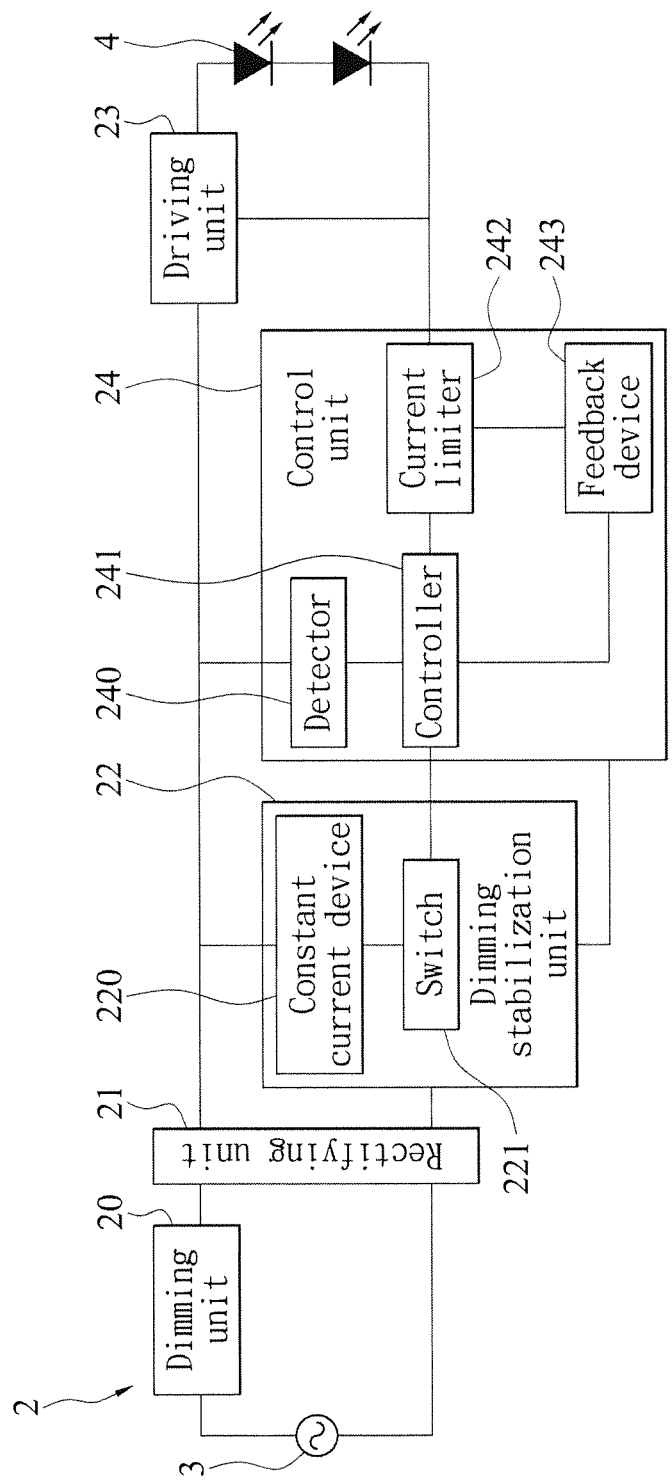
FIG. 3 is a block diagram of a first implementation mode of a preferred embodiment of the present invention.
Figure 4:
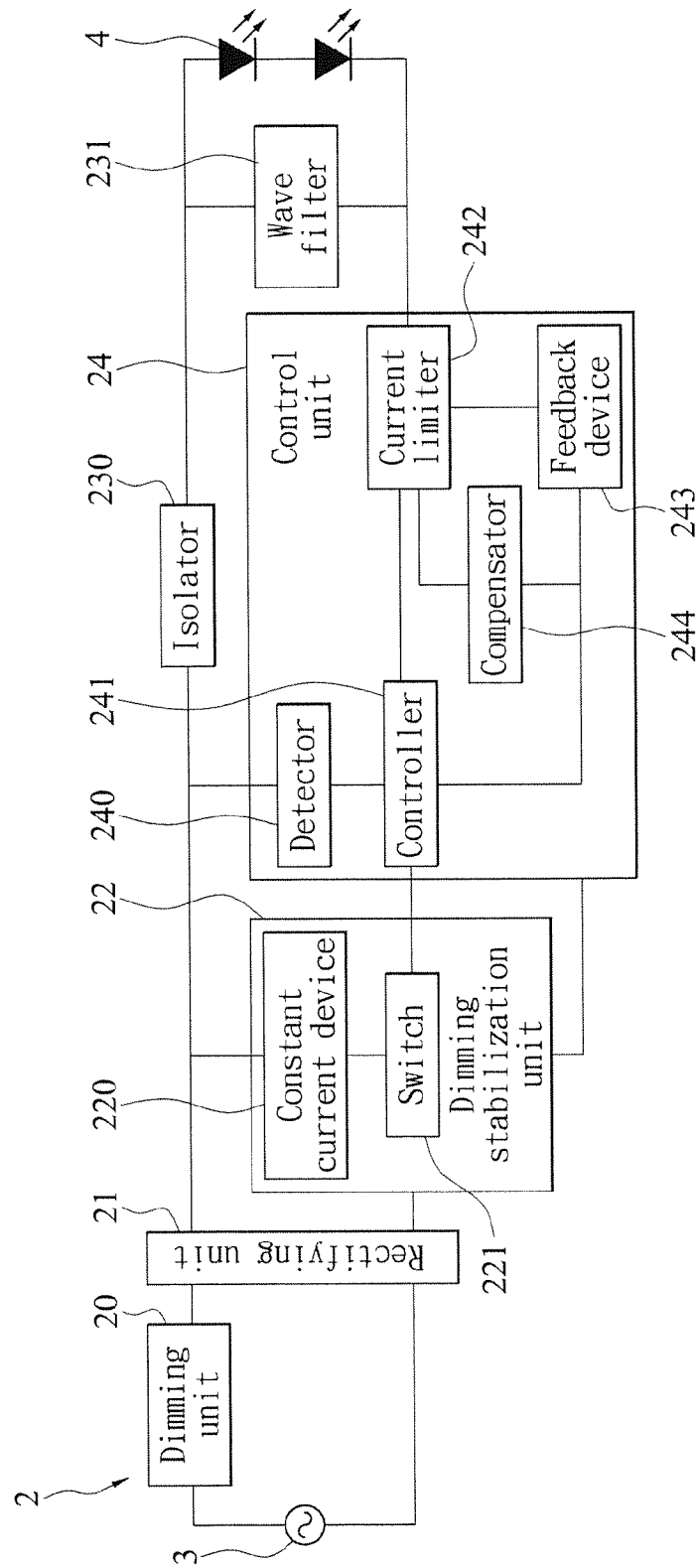
FIG. 4 is a block diagram of a second implementation mode of a preferred embodiment of the present invention.
Figure 5:
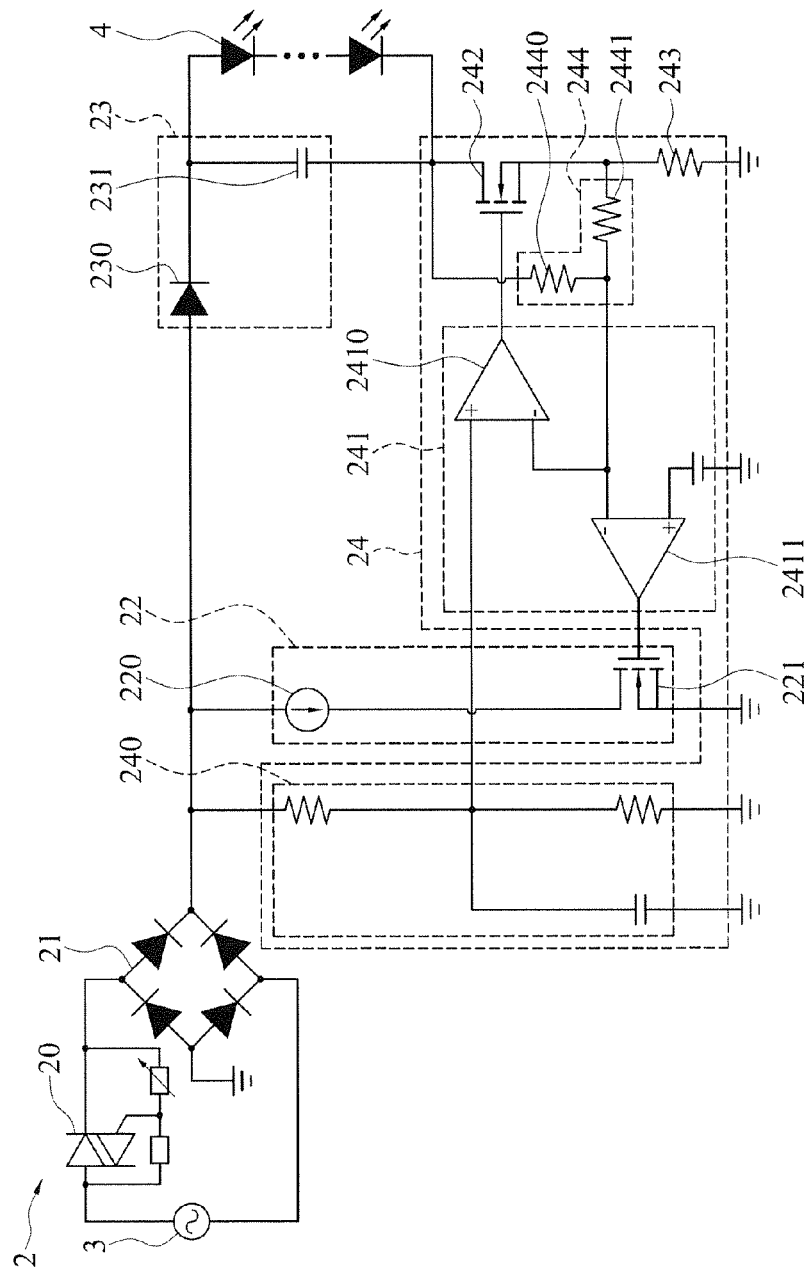
FIG. 5 is a circuit diagram of the second implementation mode of a preferred embodiment of the present invention.

With reference to FIGS. 3 to 5 for block diagrams of two implementation modes and a circuit diagram of a preferred embodiment of the present invention respectively. As shown in the figures, a variable power dimming control circuit 2 is installed at a light board module (not shown in the figures) of a lamp for converting a voltage power of an external power supply 3 to drive and linearly adjust the illumination brightness of a plurality of LEDs 4, and the LEDs 4 are electrically connected in series or in parallel and installed on the light board module. The variable power dimming control circuit 2 comprises a dimming unit 20, a rectification unit 21, a dimming stabilization unit 22, a driving unit 23 and a control unit 24, and the dimming stabilization unit 22 comprises a constant current device 220 and a switch 221, and the driving unit 23 comprises an isolator 230 and a wave filter 231, and the control unit 24 is a control chip comprising a detector 240, a controller 241, a current limiter 242, a feedback device 243 and a compensator 244. The dimming unit 20 is a TRIAC, and the rectification unit 21 is a full-wave bridge rectifier, and the full-wave bridge rectifier has an input terminal coupled to the external power supply 3 through the TRIAC to facilitate the TRIAC to receive and adjust the input phase conduction angle of the external power supply 3 and then rectify the adjusted AC voltage to produce an input voltage ($V_{in}$) and a variable DC input current ($I_{in}$) and supply them to the dimming stabilization unit 22, the driving unit 23 and the control unit 24, so as to adjust the brightness of the LEDs 4 by changing the input power of the TRIAC.

The constant current device 220 is a current mirror component, and the switch 221 and the current limiter 242 are N-MOSFETs. The isolator 230 is a diode, and the wave filter 231 is an electrolytic capacitor. The detector 240 is mainly comprised of a series of voltage division resistors and capacitors, and the controller 241 is mainly comprised of an operational amplifier 2410 and a comparator 2411, and the feedback device 243 is a resistor component ($R_S$), and the compensator 244 is mainly comprised of a first resistor ($R_1$) 2440 and a second resistor ($R_2$) 2441. The isolator 230 has an input terminal coupled to the full-wave bridge rectifier and an output terminal coupled to the electrolytic capacitor for obstructing the change of voltage source of the wave filter 231 and the light board module caused by a change of the load which may affect the operation stability of the TRIAC, and the wave filter 231 is coupled to the LEDs 4 in parallel for converting the input current transmitted from the isolator 230 to produce a driving current ($I_L$) and then transmitting the driving current ($I_L$) to the LEDs 4 to reduce the current ripple and prevent the electronic components from being damaged by a surge voltage produced instantaneously during the dimming operation by the TRIAC, so as to achieve the effect of protecting the circuit and enhancing the noise resistance of the circuit.

The current mirror component has an input terminal coupled to the full-wave bridge rectifier and an output terminal coupled to a drain of the switch 221 for receiving the input current to generate a holding current ($I_{hold}$). The detector 240 is coupled to the full-wave bridge rectifier and the positive input terminal of the operational amplifier 2410 for producing and transmitting a detection value to the operational amplifier 2410 after the input current is received and detected. The current limiter 242 has a drain coupled to the wave filter 231 and the LEDs 4, a gate coupled to an output terminal of the operational amplifier 2410, and a source coupled to the feedback device 243 and a terminal of the second resistor 2441, and the feedback device 243 receives and senses the driving current to produce a feedback value, so as to constitute a negative feedback circuit architecture to provide a stable current control effect. In addition, the current limiter 242 is installed on a surface of the light board module to improve the heat dissipation efficiency.

Figure 6:
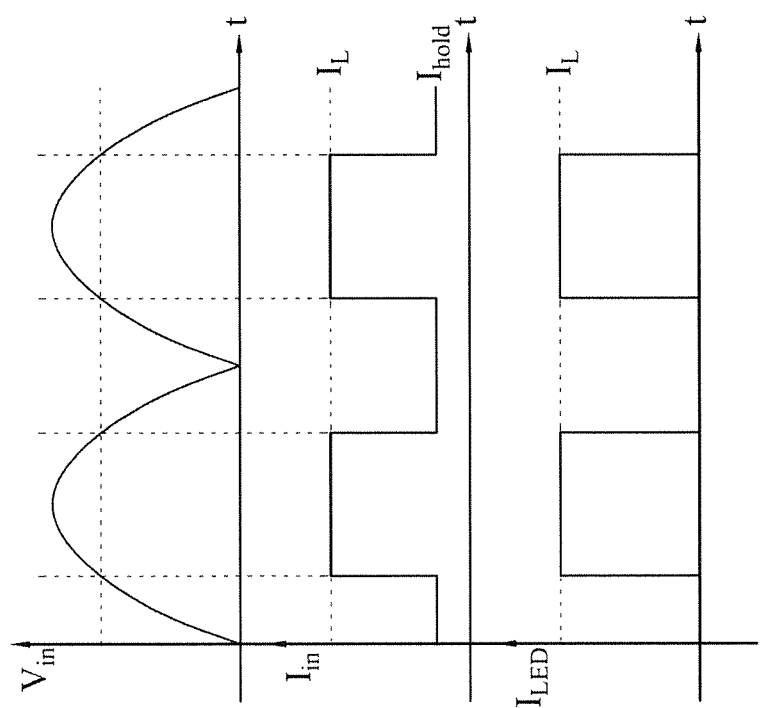
FIG. 6 is a waveform diagram of the second implementation mode of a preferred embodiment of the present invention.

The first resistor 2440 has a terminal coupled to a drain of the current limiter 242 with a voltage value $V_D$, and the other terminal coupled to the other terminal of the second resistor 2441, the negative input terminal of the operational amplifier 2410 and the negative input terminal of the comparator 2411 for receiving the feedback value. The comparator 2411 has a positive input terminal for receiving a reference value and an output terminal coupled to a gate of the switch 221. When a voltage power is inputted to the external power supply 3 such that the control unit 24 obtains a detection value $V_A$ and the feedback value, the operational amplifier 2410 compares the detection value with the feedback value. If the detection value is greater than the feedback value, a driving signal of a high voltage level will be outputted to conduct the current limiter 242 and drive and adjust the current magnitude of the driving current. Now, the input current and the driving current satisfy the relation of $I_{in}=I_L$, and $I_L=[V_A-V_D(R_2/R_1+R_2)]/R_S$ is also equal to the current value ($I_{LED}$) of the current passing through the LEDs 4. In the meantime, the controller 2411 compares the feedback value with the reference value. If the feedback value is greater than the reference value, a stable signal of a low voltage level will be outputted to cut off the switch 221 and stop the current mirror component from outputting the holding current. On the other hand, if the detection value is smaller than the feedback value and the feedback value is smaller than the reference value (in other words, when the LEDs 4 are dimmed to a minimum brightness and the driving current is very small) the operational amplifier 2410 will output the driving signal of the low voltage level to cut off the current limiter 242 to periodically stop the output of the driving current, and the controller 2411 will output a stable signal of the high voltage level to conduct the switch 221 and allow the current mirror component to output the holding current, so that the input current and the holding current satisfy the relation of $I_{in}=I_{hold}$. In FIG. 6, when the brightness of an LED lamp is increased to a high or full brightness, the output of the holding current is stopped. Since the operating current of the circuit has a constant current value, therefore the operation of the TRAIC will not be abnormal and necessary power consumption of the circuit can be reduced. When the LED lamp is dimmed to a very low brightness or turned off, the lamp starts outputting the holding current to assure a normal operation of the dimming unit 20 and a full dimming range.

Figure 7:
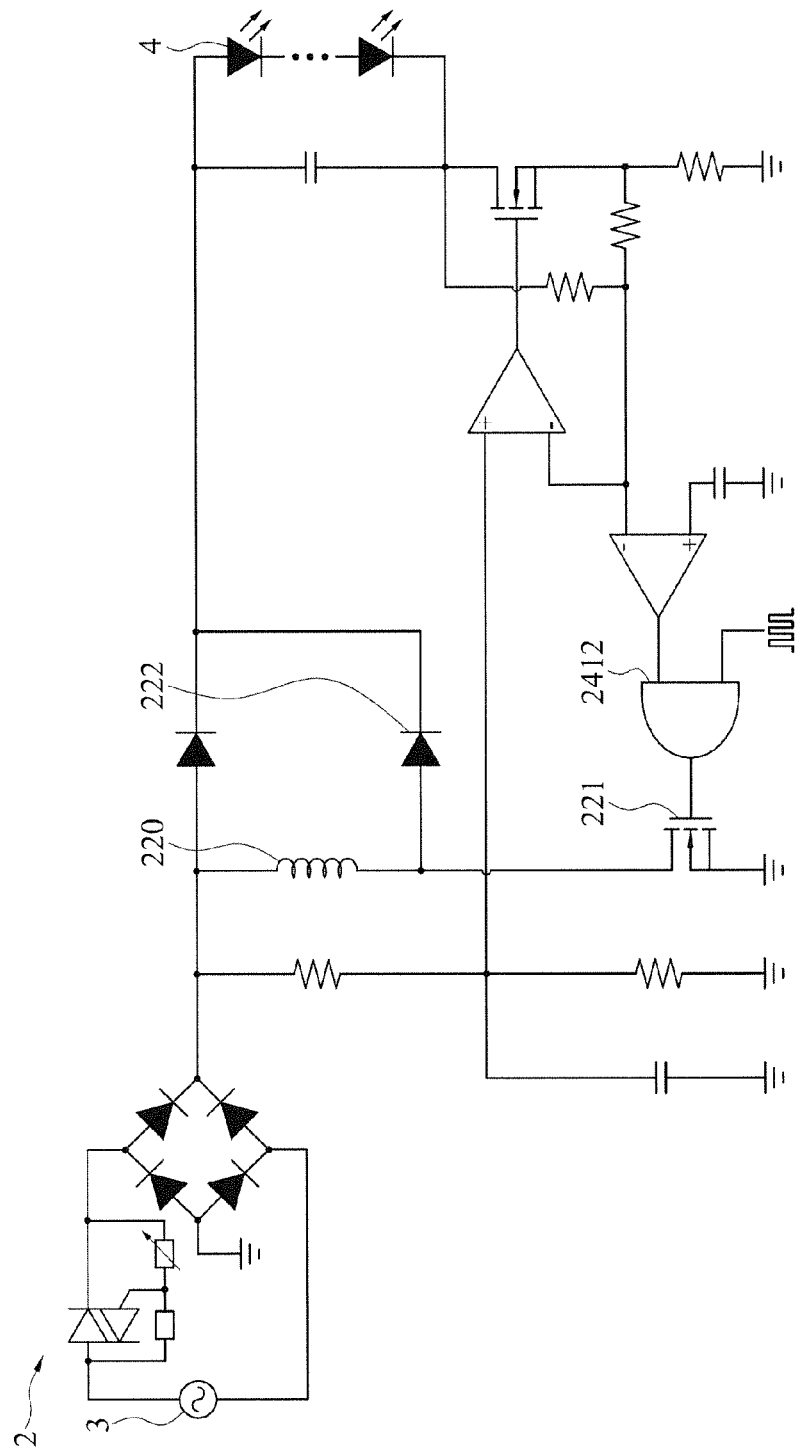
FIG. 7 is a circuit diagram of a third implementation mode of a preferred embodiment of the present invention.
Figure 8:
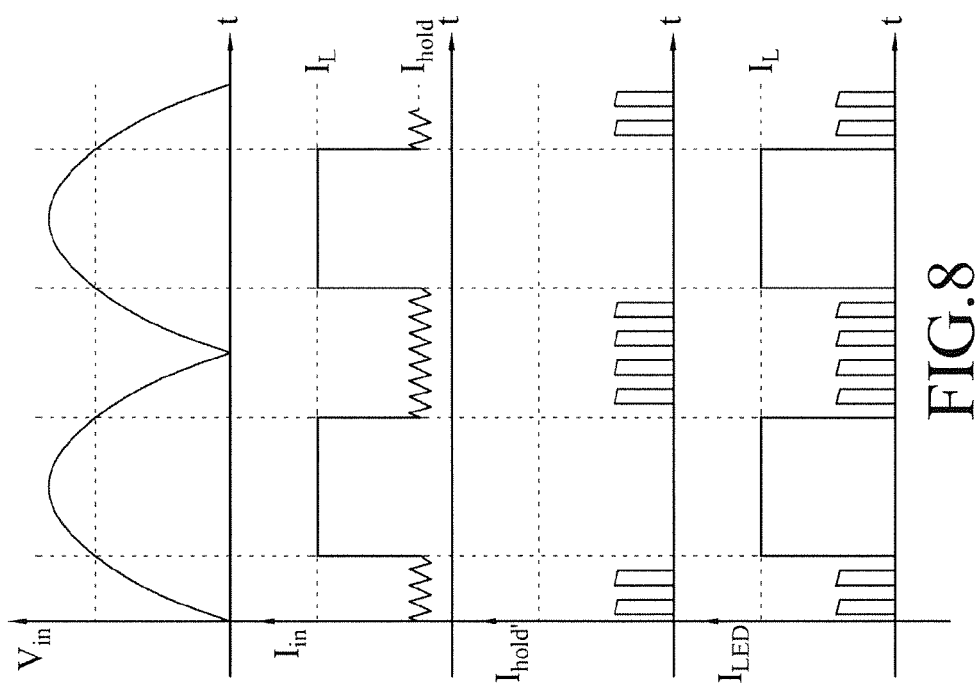
FIG. 8 is a waveform diagram of the third implementation mode of a preferred embodiment of the present invention.

In this preferred embodiment, the dimming stabilization unit 22 as shown in FIG. 7 further includes a transfer diode 222, and the constant current device 220 is a power transfer component such as an inductor, and the controller 241 is mainly comprised of the operational amplifier 2410, the comparator and an AND gate 2412. The operational amplifier 2410 has an output terminal coupled to a gate of the current limiter 242, a positive input terminal coupled to the detector 240 for receiving the detection value, and a negative input terminal coupled to a negative input terminal of the comparator 2411 and the feedback device 243 for receiving the feedback value. The comparator 2411 has a positive input terminal for receiving the reference value and an output terminal coupled to an input terminal of the AND gate 2412, and the other input terminal of the AND gate 2412 is provided for receiving a reference wave such as a pulse wave, and the output terminal of the AND gate 2412 is coupled to a gate of the switch 221, and a drain of the switch 221 is coupled to an output terminal of the power transfer component. The transfer diode 222 has an input terminal coupled to the inductor and an output terminal coupled to the isolator 230 and the wave filter 231, and the input current converted by the inductor passes through the transfer diode to produce a secondary holding current ($I_{hold}'$), so that the driving current satisfies the relation of $I_L=[V_A-V_D(R_2/R_1+R_2)]/R_S+I_{hold}'$, and the aforementioned power transfer method as shown in FIG. 8 can improve the overall circuit performance of the variable power dimming control circuit 2.

What is claimed is:

1. A variable power dimming control circuit, for driving and linearly adjusting the illumination brightness of a plurality of light emitting diodes (LEDs) and the LEDs being electrically connected in series with each other or installed in parallel with each other on a light board module, comprising:
a dimming unit, electrically coupled to an external power supply;
a rectification unit, electrically coupled to the dimming unit, for receiving and rectifying an alternate current (AC) voltage of the external power supply and outputting an input current;
a dimming stabilization unit, including a constant current device and a switch, and the constant current device being electrically coupled to the rectification unit and the switch for receiving the input current to generate a holding current;
a driving unit, electrically coupled to the rectification unit, the constant current device and the light board module, for receiving the input current and supplying a driving current to the LEDs; and
a control unit, having a detector, a controller, a current limiter and a feedback device, the detector electrically coupled to the rectification unit, the driving unit and the controller, and the controller being electrically coupled to the switch, the current limiter and the feedback device, and the current limiter being electrically coupled to the light board module and the feedback device, and the detector being provided for receiving and detecting the input current to produce a detection value, and the feedback device being provided for receiving and sensing the driving current to produce a feedback value, and the controller being provided for comparing the detection value with the feedback value and outputting a driving signal to drive the current limiter to adjust the current value of the driving current, such that the input current $I_{in}$ and the driving current $I_L$ satisfy the relation of $I_{in}=I_L$, the controller compares the feedback value with a reference value, and outputs a stable signal to conduct the switch and allow the dimming stabilization unit to output the holding current if the feedback value is smaller than the reference value, so that when the LEDs are adjusted to a minimum brightness or turned off, the input current $I_{in}$ and the holding current $I_{hold}$ satisfy the relation of $I_{in}=I_{hold}$ for stabilizing the operating quality of the dimming unit and reducing unnecessary power consumption.

2. The variable power dimming control circuit of claim 1, wherein the rectification unit is a full-wave bridge rectifier, and the dimming unit is a bidirectional triode for alternating current (TRIAC) for receiving and adjusting an input phase conduction angle of the external power supply to change the input power and adjust the brightness of light emitted from the LEDs.

3. The variable power dimming control circuit of claim 2, wherein the driving unit includes an isolator and a wave filter, and both ends of the isolator are coupled to the full-wave bridge rectifier and the wave filter respectively to obstruct the wave filter and the light board module to have a voltage change caused by a load change that affects the operating stability of the bidirectional TRIAC, and the wave filter is connected to the LEDs in parallel for converting an input current transmitted from the isolator into the driving current and transmitting the driving current to the LEDs to enhance the noise resistance of the circuit.

4. The variable power dimming control circuit of claim 3, wherein the current limiter is an N-MOSFET, and the feedback device is a resistor component, and the current limiter has a drain coupled to the wave filter and the LEDs, a gate coupled to an output terminal of the controller, and a source coupled to the feedback device to constitute a negative feedback circuit architecture to provide a stable current control effect, and the current limiter is installed on a surface of the light board module to enhance the heat dissipation efficiency.

5. The variable power dimming control circuit of claim 4, wherein the constant current device is a current mirror component, and the switch is an N-MOSFET, and the controller is comprised of an operational amplifier and a comparator; and the operational amplifier has an output terminal coupled to a gate of the current limiter, a positive input terminal coupled to the detector for receiving the detection value, and a negative input terminal coupled to a negative input terminal of the comparator and the feedback device for receiving the feedback value; and the comparator has a positive input terminal for receiving the reference value and an output terminal coupled to a gate of the switch, and a drain of the switch is coupled to an output terminal of the current mirror component.

6. The variable power dimming control circuit of claim 5, wherein the control unit further includes a compensator, and the compensator is comprised of a first resistor $R_1$ and a second resistor $R_2$, and a terminal of the first resistor is coupled to a drain of the current limiter and has a voltage value $V_D$, and the other terminal of the first resistor is coupled to a terminal of the second resistor, a negative input terminal of the operational amplifier and a negative input terminal of the comparator, and the other terminal of the second resistor is coupled to the feedback device $R_S$, so that when the positive input terminal of the operational amplifier receives the detection value $V_A$, the driving current $I_L$ satisfies the relation of $I_L=[V_A-V_D(R_2/R_1+R_2)]/R_S$.

7. The variable power dimming control circuit of claim 4, wherein the constant current device is a power transfer component, and the switch is an N-MOSFET, and the controller is comprised of an operational amplifier, a comparator and an AND gate, and the operational amplifier has an output terminal coupled to a gate of the current limiter, a positive input terminal coupled to the detector for receiving the detection value, and a negative input terminal coupled to a negative input terminal of the comparator and the feedback device for receiving the feedback value, and a positive input terminal of the comparator is provided for receiving the reference value and an output terminal is coupled to an input terminal of the AND gate, and the other input terminal of the AND gate is provided for receiving a reference wave and an output terminal of the AND gate is coupled to a gate of the switch, and a drain of the switch is coupled to an output terminal of the power transfer component.

8. The variable power dimming control circuit of claim 7, wherein the power transfer component is an inductor, and the dimming stabilization unit further includes a transfer diode having an input terminal coupled to the inductor and an output terminal coupled to the isolator and the wave filter, so that the input current is transferred by the inductor and passed through the transfer diode to produce a secondary holding current $I_{hold}'$.

9. The variable power dimming control circuit of claim 8, wherein the control unit further includes a compensator comprised of a first resistor $R_1$ and a second resistor $R_2$, and a terminal of the first resistor is coupled to the drain of the current limiter and has a voltage value $V_D$, and the other terminal of the first resistor is coupled to a terminal of the second resistor, a negative input terminal of the operational amplifier and a negative input terminal of the comparator, and the other terminal of the second resistor is coupled to the feedback device $R_S$, so that when the positive input terminal of the operational amplifier receives the detection value $V_A$, the driving current $I_L$ satisfies the relation of $I_L=[V_A-V_D(R_2/R_1+R_2)]/R_S+I_{hold}'$.

* * * * *